United States Patent Office

3,271,246
Patented Sept. 6, 1966

3,271,246
METHOD OF CONTROLLING SEA LAMPREY
John H. Howell and Everett L. King, Jr., Cheboygan, Mich., assignors to the United States of America as represented by the Secretary of the Interior
No Drawing. Filed Jan. 6, 1964, Ser. No. 336,079
15 Claims. (Cl. 167—46)

The invention herein described and claimed may be used by or for the Government of the United States of America for governmental purposes without the payment of royalties thereon or therefor.

The invention relates to control of the sea lamprey (*Petromyzon marinus*), and more particularly, to chemical treatment of aquatic habitats in which the larval stage of the lamprey lives and grows.

In recent years the lamprey has been a serious threat to food and game fish, particularly in the Great Lakes of North America. Exemplary of the seriousness of the sea lamprey menace is the virtually complete destruction of the trout harvest from the Great Lakes. In 1946, commercial fishermen took 6,500,000 pounds of trout from Lake Michigan; in 1955 only 34 pounds of trout were taken from that lake as a result of the invasion of the sea lamprey.

Various means have been employed to destroy or control the lamprey, including chemical means such as described in Patents Nos. 2,821,499 and 3,052,601. Although such chemical means have met with considerable success, chemicals of improved toxicity and selectivity would enable a still more efficient attack on the lamprey, particularly in the larval stages. Selectivity is desirable in order to destroy the lamprey larvae without killing food and game fish, particularly trout.

It is therefore an object of the present invention to provide a larvicide which will effect a substantially complete eradication of larval lampreys in a water course without causing significant harm or mortality of game and food fish.

It has now been found that this may be achieved by means of a synergistic combination of 3-trifluormethyl-4-nitrophenol (TFM) and 2′,5-dichloro-4′-nitrosalicylanilide. The latter compound has the structural formula

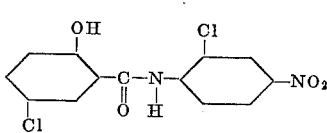

and its preparation is described in Patent No. 3,079,297. Use of TFM as a sea lamprey larvicide is described in Great Lakes Fishery Commission, Technical Report No. 1, May 1961 and in Science, vol. 127, page 337, February 14, 1958. This combination has been found to give superior results in terms of both toxicity and selectivity as will be evident from the data presented in the examples below.

It has also been found that 2′,5-dichloro-4′-nitrosalicylanilide, when used alone, possesses outstanding lamprecidal activity at low concentrations.

Concentrations of the chemicals in the water is important since optimum selectivity will generally depend on proper selection of concentration. For example, the use of too high a concentration of chemicals would result in high or total mortality of both lamprey larvae and food or game fish, whereas too small a concentration would be ineffective in killing the lamprey larvae. Optimum concentration of the chemicals in the water will vary considerably with conditions such as temperature, pH of water, types and numbers of food and game fish, numbers of lamprey larvae, etc., and is best determined experimentally by means of laboratory tests simulating conditions of actual proposed use.

When a combination of the two chemicals is used, in order to achieve the desired synergistic effect, the relative concentrations of chemicals is also important for optimum efficiency and selectivity. Again, the optimum ratios are best determined empirically.

The invention will be further illustrated, but is not intended to be limited, by the following examples which show the toxicity and selectivity of the lamprecidal compositions of the invention with respect to larval lampreys and rainbow trout. In these examples bioassay tests were made using TFM and 2′,5-dichloro-4′-nitrosalicylanilide alone and mixtures of the two containing concentrations of 2′,5-dichloro-4′-nitrosalicylanilide of 1, 2 and 3 percent, which corresponds to a weight ratio of 32 to about 99 parts of TFM per part of 2′,5-dichloro-4′-nitrosalicylanilide. In each of the examples the TFM was used in the form of its sodium salt. The tests were carried out in 10-liter glass battery jars (10-inch diameter), each containing 6 liters of test solution. The jars were aerated by means of standard stone air-breakers to maintain oxygen levels at near-saturation. Temperatures (55° F.) were held constant by immersion of the test jars in a water bath.

Test animals were larvae of the seat lamprey (*Petromyzon marinus*) and fingerling rainbow trout (*Salmo gairdneri*), both ranging from about 3.0 to about 5.0 inches in length. After the animals were tempered and acclimated to the test temperature, appropriate amounts of TFM or 2′,5-dichloro-4′-salicylanilide or a combination of the two were added in aqueous solution to produce the desired concentrations. The aqueous solution was prepared as follows: A 30 percent formulation of TFM, in the form of the sodium salt, was prepared in dimethylformamide as solvent. To this formulation was added the required amount of 2′,5-dichloro-4′-nitrosalicylanilide. This formulation was then weighed and diluted with water to provide the desired concentration in the tests. Other conditions and results are given in the following tables.

TABLE I.—LAMPRECIDE: 2',5-DICHLORO-4'-NITROSALICYLANILIDE

[Water source: Lake Huron water from tap. Test Period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| .300 | 5 | 10 | 100 | 10 | 100 |
| .250 | 5 | 10 | 100 | 10 | 100 |
| .225 | 5 | 10 | 100 | 10 | 100 |
| .200 | 5 | 10 | 100 | 10 | 100 |
| .175 | 5 | 10 | 100 | 10 | 100 |
| .150 | 5 | 10 | 100 | 10 | 100 |
| .100 | 10 | 20 | 100 | 20 | 45 |
| .090 | 10 | 20 | 100 | 20 | 75 |
| .080 | 10 | 20 | 100 | 20 | 45 |
| .070 | 10 | 20 | 100 | 20 | 5 |
| .060 | 10 | 20 | 55 | 20 | 5 |
| .050 | 10 | 20 | 45 | 20 | 15 |
| .030 | 10 | 20 | 0 | 20 | 0 |

TABLE II.—LAMPRECIDE: 2',5-DICHLORO-4'-NITROSALICYLANILIDE

[Velocity of kill: Sea lamprey larvae and rainbow trout (10[1] and 20[2] specimens exposed; number dead at indicated time intervals in body of table). Test water: Lake Huron water from tap.]

| Concentration in parts per million | Hours of Exposure | | | | | | | | | | | | | | |
|---|---|---|---|---|---|---|---|---|---|---|---|---|---|---|---|
| | ½ | 1 | 1½ | 2 | 2½ | 3 | 3½ | 4 | 4½ | 5 | 5½ | 6 | 6½ | 7 | 7½ | 24 |

Larval lampreys

| Concentration in parts per million | ½ | 1 | 1½ | 2 | 2½ | 3 | 3½ | 4 | 4½ | 5 | 5½ | 6 | 6½ | 7 | 7½ | 24 |
|---|---|---|---|---|---|---|---|---|---|---|---|---|---|---|---|---|
| .030 | 0 | 0 | 0 | 0 | 0 | 0 | 0 | 0 | 0 | 0 | 0 | 0 | 0 | 0 | 0 | 0 |
| .050 | 0 | 0 | 0 | 0 | 0 | 0 | 0 | 0 | 0 | 1 | 1 | 2 | 2 | 2 | 2 | 9 |
| .060 | 0 | 0 | 0 | 0 | 1 | 2 | 3 | 3 | 3 | 4 | 4 | 6 | 6 | 6 | 9 | 11 |
| .070 | 0 | 0 | 0 | 0 | 1 | 1 | 6 | 8 | 12 | 15 | 17 | 17 | 19 | 19 | 19 | 20 |
| .080 | 0 | 0 | 0 | 0 | 0 | 4 | 12 | 17 | 17 | 20 | | | | | | |
| .090 | 0 | 0 | 0 | 0 | 4 | 7 | 15 | 17 | 17 | 19 | 20 | | | | | |
| .100 | 0 | 0 | 0 | 0 | 4 | 14 | 19 | 20 | | | | | | | | |
| .150 | 0 | 0 | 0 | 2 | 9 | 9 | 10 | | | | | | | | | |
| .175 | 0 | 0 | 2 | 4 | 5 | 9 | 10 | | | | | | | | | |
| .200 | 0 | 0 | 1 | 7 | 8 | 10 | | | | | | | | | | |
| .225 | 0 | 0 | 3 | 6 | 9 | 10 | | | | | | | | | | |
| .250 | 0 | 0 | 1 | 3 | 8 | 9 | 10 | | | | | | | | | |
| .300 | 0 | 0 | 4 | 5 | 7 | 10 | | | | | | | | | | |

Rainbow trout

| Concentration in parts per million | ½ | 1 | 1½ | 2 | 2½ | 3 | 3½ | 4 | 4½ | 5 | 5½ | 6 | 6½ | 7 | 7½ | 24 |
|---|---|---|---|---|---|---|---|---|---|---|---|---|---|---|---|---|
| .030 | 0 | 0 | 0 | 0 | 0 | 0 | 0 | 0 | 0 | 0 | 0 | 0 | 0 | 0 | 0 | 0 |
| .050 | 0 | 0 | 1 | 1 | 2 | 2 | 3 | 3 | 3 | 3 | 3 | 3 | 3 | 3 | 3 | 3 |
| .060 | 0 | 1 | 1 | 1 | 1 | 1 | 1 | 1 | 1 | 1 | 1 | 1 | 1 | 1 | 1 | 1 |
| .070 | 0 | 0 | 1 | 1 | 1 | 1 | 1 | 1 | 1 | 1 | 1 | 1 | 1 | 1 | 1 | 1 |
| .080 | 0 | 6 | 7 | 8 | 8 | 8 | 8 | 8 | 8 | 8 | 8 | 8 | 8 | 8 | 9 | 9 |
| .090 | 0 | 6 | 12 | 13 | 13 | 15 | 15 | 15 | 15 | 15 | 15 | 15 | 15 | 15 | 15 | 15 |
| .100 | 1 | 3 | 9 | 9 | 9 | 9 | 9 | 9 | 9 | 9 | 9 | 9 | 9 | 9 | 9 | 9 |
| .150 | 4 | 9 | 9 | 10 | | | | | | | | | | | | |
| .175 | 10 | | | | | | | | | | | | | | | |
| .200 | 10 | | | | | | | | | | | | | | | |
| .225 | 10 | | | | | | | | | | | | | | | |
| .250 | 9 | 10 | | | | | | | | | | | | | | |
| .300 | 9 | 10 | | | | | | | | | | | | | | |

[1] 10 specimens exposed from .150 to .300.   [2] 20 specimens exposed from .030 to .100.

TABLE III.—LAMPRECIDE: 3-TRIFLUORMETHYL-4-NITROPHENOL

[Test period: 24 hours. Water temperature: 55 degrees F. Water Source: Lake Huron water from tap.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 1.0 | 4 | 8 | 0.0 | 8 | 0.0 |
| 1.5 | 4 | 8 | 87.5 | 8 | 0.0 |
| 2.0 | 4 | 8 | 100.0 | 8 | 0.0 |
| 2.5 | 4 | 8 | 100.0 | 8 | 0.0 |
| 3.0 | 4 | 8 | 100.0 | 8 | 0.0 |
| 4.0 | 4 | 8 | 100.0 | 8 | 0.0 |
| 4.5 | 4 | 8 | 100.0 | 8 | 0.0 |
| 5.0 | 4 | 8 | 100.0 | 8 | 12.5 |
| 6.0 | 4 | 8 | 100.0 | 8 | 25.0 |
| 7.0 | 4 | 8 | 100.0 | 8 | 75.0 |
| 9.0 | 4 | 8 | 100.0 | 8 | |
| Totals | 44 | 88 | | 88 | |

TABLE IV.—LAMPRECIDE: 3-TRIFLUORMETHYL-4-NITROPHENOL

[Velocity of kill: Sea lamprey larvae and rainbow trout (8 specimens exposed; numbers dead at indicated time intervals given in body of table). Test water: Lake Huron water from tap.]

| Conc. of TFM in p.p.m. | Hours Exposure | | | | | |
|---|---|---|---|---|---|---|
| | 1 | 2 | 3 | 4 | 5 | 24 |
| 1.0 | 0 | 0 | 0 | 0 | 0 | 0 |
| 1.5 | 0 | 0 | 0 | 0 | 0 | 7 |
| 2.0 | 0 | 0 | 0 | 0 | 1 | 8 |
| 2.5 | 0 | 0 | 0 | 0 | 3 | 8 |
| 3.0 | 0 | 0 | 0 | 3 | 4 | 8 |
| 4.0 | 0 | 0 | 1 | 7 | 8 | -- |
| 4.5 | 0 | 0 | 7 | 7 | 8 | -- |
| 5.0 | 0 | 0 | 7 | 7 | 8 | -- |
| 6.0 | 0 | 0 | 8 | -- | -- | -- |
| 7.0 | 0 | 2 | 8 | -- | -- | -- |
| 9.0 | 0 | 4 | 8 | -- | -- | -- |

| | Rainbow Trout | | | | | |
|---|---|---|---|---|---|---|
| 1.0 | 0 | 0 | 0 | 0 | 0 | 0 |
| 1.5 | 0 | 0 | 0 | 0 | 0 | 0 |
| 2.0 | 0 | 0 | 0 | 0 | 0 | 0 |
| 2.5 | 0 | 0 | 0 | 0 | 0 | 0 |
| 3.0 | 0 | 0 | 0 | 0 | 0 | 0 |
| 3.5 | 0 | 0 | 0 | 0 | 0 | 0 |
| 4.0 | 0 | 0 | 0 | 0 | 0 | 0 |
| 4.5 | 0 | 0 | 0 | 0 | 0 | 0 |
| 5.0 | 0 | 0 | 0 | 0 | 0 | 0 |
| 6.0 | 0 | 0 | 0 | 1 | 1 | 1 |
| 7.0 | 0 | 0 | 1 | 1 | 1 | 2 |
| 9.0 | 0 | 1 | 4 | 4 | 4 | 6 |

TABLE V.—LAMPRECIDE: 3-TRIFLUORMETHYL-4-NITROPHENOL (97%) AND 2′,5-DICHLORO-4′-NITROSALICYLANILIDE (3%)

[Water source: Lake Huron water from tap. Test period: 24 hours. Water temperature: 55 degrees F.]

| Conc. of mixture in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.8 | 4 | 8 | 62.5 | 8 | 0.0 |
| 0.9 | 4 | 8 | 100.0 | 8 | 0.0 |
| 1.0 | 4 | 8 | 100.0 | 8 | 0.0 |
| 1.1 | 4 | 8 | 100.0 | 8 | 0.0 |
| 1.3 | 4 | 8 | 100.0 | 8 | 0.0 |
| 1.9 | 4 | 8 | 100.0 | 8 | 25.0 |
| 2.0 | 4 | 8 | 100.0 | 8 | 0.0 |
| 2.1 | 4 | 8 | 100.0 | 8 | 37.5 |
| 2.2 | 4 | 8 | 100.0 | 8 | 37.5 |
| 2.3 | 4 | 8 | 100.0 | 8 | 25.0 |
| 2.5 | 4 | 8 | 100.0 | 8 | 62.5 |
| Totals | 44 | 88 | -- | 88 | -- |

TABLE VI.—LAMPRECIDE: 3-TRIFLUORMETHYL-4-NITROPHENOL (97%) AND 2′,5-DICHLORO-4′-NITROSALICYLANILIDE (3%)

[Velocity of kill: Sea lamprey larvae and rainbow trout (8 specimens exposed; numbers dead at indicated time intervals given in body of table)]

| Conc. of mixture in p.p.m. | Hours of Exposure | | | | | |
|---|---|---|---|---|---|---|
| | 1 | 2 | 3 | 4 | 5 | 24 |
| 0.8 | 0 | 0 | 0 | 0 | 0 | 5 |
| 0.9 | 0 | 0 | 0 | 0 | 0 | 8 |
| 1.0 | 0 | 0 | 0 | 0 | 1 | 8 |
| 1.1 | 0 | 0 | 0 | 0 | 4 | 8 |
| 1.3 | 0 | 0 | 4 | 6 | 8 | -- |
| 1.9 | 0 | 4 | 8 | -- | -- | -- |
| 2.0 | 0 | 4 | 8 | -- | -- | -- |
| 2.1 | 0 | 1 | 8 | -- | -- | -- |
| 2.2 | 0 | 0 | 8 | -- | -- | -- |
| 2.3 | 0 | 5 | 8 | -- | -- | -- |
| 2.5 | 0 | 8 | -- | -- | -- | -- |

| | Rainbow trout | | | | | |
|---|---|---|---|---|---|---|
| 0.8 | 0 | 0 | 0 | 0 | 0 | 0 |
| 0.9 | 0 | 0 | 0 | 0 | 0 | 0 |
| 1.0 | 0 | 0 | 0 | 0 | 0 | 0 |
| 1.1 | 0 | 0 | 0 | 0 | 0 | 0 |
| 1.3 | 0 | 0 | 0 | 0 | 0 | 0 |
| 1.9 | 0 | 0 | 0 | 0 | 0 | 2 |
| 2.0 | 0 | 0 | 0 | 0 | 0 | 0 |
| 2.1 | 1 | 3 | 3 | 3 | 3 | 3 |
| 2.2 | 2 | 3 | 3 | 3 | 3 | 3 |
| 2.3 | 0 | 2 | 2 | 2 | 2 | 2 |
| 2.5 | 3 | 4 | 5 | 5 | 5 | 5 |

TABLE VII.—LAMPRECIDE: 3-TRIFLUORMETHYL-4-NITROPHENOL (98%) AND 2′,5-DICHLORO-4′-NITROSALICYLANILIDE (2%)

[Water source: Lake Huron water from tap. Test period: 24 hours. Water temperature: 55 degrees F.]

| Concentration of mixture in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.6 | 2 | 4 | 0.0 | 4 | 0.0 |
| 0.8 | 2 | 4 | 100.0 | 4 | 0.0 |
| 1.0 | 2 | 4 | 100.0 | 4 | 0.0 |
| 1.1 | 2 | 4 | 100.0 | 4 | 0.0 |
| 1.3 | 2 | 4 | 100.0 | 4 | 0.0 |
| 1.5 | 2 | 4 | 100.0 | 4 | 0.0 |
| 1.6 | 2 | 4 | 100.0 | 4 | 0.0 |
| 1.8 | 2 | 4 | 100.0 | 4 | 0.0 |
| 2.0 | 2 | 4 | 100.0 | 4 | 0.0 |
| 2.5 | 2 | 4 | 100.0 | 4 | 0.0 |
| 3.0 | 2 | 4 | 100.0 | 4 | 50.0 |
| Totals | 22 | 44 | -- | 44 | -- |

TABLE VIII.—LAMPRECIDE: 3-TRIFLUORMETHYL-4-NITROPHENOL (98%) 2', 5-DICHLORO-4'-NITROSALICYLANILIDE (2%)

[Velocity of kill: Sea lamprey larvae (4 specimens exposed; numbers dead at indicated time intervals given in body of table). Test water: Lake Huron water from tap.]

| Concentration of mixture in p.p.m. | 1 | 2 | 3 | 4 | 5 | 6 | 24 |
|---|---|---|---|---|---|---|---|
| 0.6 | 0 | 0 | 0 | 0 | 0 | 0 | 0 |
| 0.8 | 0 | 0 | 0 | 0 | 0 | 0 | 4 |
| 1.0 | 0 | 0 | 0 | 0 | 0 | 0 | 4 |
| 1.1 | 0 | 0 | 0 | 0 | 0 | 1 | 4 |
| 1.3 | 0 | 0 | 0 | 1 | 4 | | |
| 1.5 | 0 | 0 | 0 | 3 | 4 | | |
| 1.6 | 0 | 0 | 0 | 4 | | | |
| 1.8 | 0 | 0 | 3 | 4 | | | |
| 2.0 | 0 | 0 | 4 | | | | |
| 2.5 | 0 | 0 | 4 | | | | |
| 3.0 | 0 | 3 | 4 | | | | |

TABLE IX.—LAMPRECIDE: 3-TRIFLUORMETHYL-4-NITROPHENOL (99%) AND 2',5-DICHLORO-4'-NITROSALICYLANILIDE (1%)

[Water source: Lake Huron water from tap. Test period: 24 hours. Water temperature: 55 degrees F.]

| Concentration of mixture in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.8 | 2 | 4 | 25.0 | 4 | 0.0 |
| 1.0 | 2 | 4 | 50.0 | 4 | 0.0 |
| 1.2 | 2 | 4 | 75.0 | 4 | 0.0 |
| 1.4 | 2 | 4 | 100.0 | 4 | 0.0 |
| 1.6 | 2 | 4 | 100.0 | 4 | 0.0 |
| 2.5 | 2 | 4 | 100.0 | 4 | 0.0 |
| 3.5 | 2 | 4 | 100.0 | 4 | 0.0 |
| 4.0 | 2 | 4 | 100.0 | 4 | 25.0 |
| 4.5 | 2 | 4 | 100.0 | 4 | 25.0 |
| 5.0 | 2 | 4 | 100.0 | 4 | 75.0 |
| 6.0 | 2 | 4 | 100.0 | 4 | 75.0 |
| Totals | 22 | 44 | | 44 | |

TABLE X.—LAMPRECIDE: 3-TRIFLUORMETHYL-4-NITROPHENOL (99%) AND 2',5-DICHLORO-4'-NITROSALICYLANILIDE (1%).

[Velocity of kill: Sea lamprey larvae and rainbow trout (4 specimens exposed; numbers dead at indicated time intervals given in body of table). Test water: Lake Huron water from tap.]

| Conc. of TFM in p.p.m. | Hours of Exposure | | | | | |
|---|---|---|---|---|---|---|
| | 1 | 2 | 3 | 4 | 5 | 24 |
| 0.8 | 0 | 0 | 0 | 0 | 0 | 1 |
| 1.0 | 0 | 0 | 0 | 0 | 0 | 2 |
| 1.2 | 0 | 0 | 0 | 0 | 0 | 3 |
| 1.4 | 0 | 0 | 0 | 0 | 0 | 4 |
| 1.6 | 0 | 0 | 0 | 0 | 1 | 4 |
| 2.5 | 0 | 0 | 0 | 3 | 4 | |
| 3.5 | 0 | 4 | | | | |
| 4.0 | 0 | 3 | 4 | | | |
| 4.5 | 0 | 4 | | | | |
| 5.0 | 0 | 4 | | | | |
| 6.0 | 0 | 4 | | | | |

Rainbow trout

| 0.8 | 0 | 0 | 0 | 0 | 0 | 0 |
| 1.0 | 0 | 0 | 0 | 0 | 0 | 0 |
| 1.2 | 0 | 0 | 0 | 0 | 0 | 0 |
| 1.4 | 0 | 0 | 0 | 0 | 0 | 0 |
| 1.6 | 0 | 0 | 0 | 0 | 0 | 0 |
| 2.5 | 0 | 0 | 0 | 0 | 0 | 0 |
| 3.5 | 0 | 0 | 0 | 0 | 0 | 0 |
| 4.0 | 0 | 0 | 0 | 0 | 0 | 1 |
| 4.5 | 0 | 0 | 0 | 0 | 0 | 1 |
| 5.0 | 0 | 0 | 3 | 3 | 3 | 3 |
| 6.0 | 0 | 0 | 0 | 0 | 1 | 3 |

TABLE XI

[Comparative toxicity of TFM, 2',5-dichloro-4'-nitrosalicylanilide and various percentage mixtures of the two compounds. All tests conducted in a single lot of Lake Huron water [1] at 55° F. for 20 hours. MLC-100 [2] for larvae and MLC-25 [3] for rainbow trout.]

| Percentage of 2',5-dichloro-4'-nitrosalicylanilide | Minimum lethal for larvae (p.p.m.) | Maximum allowable for rainbow trout (p.p.m.) | Percentage increase in toxicity over TFM | Differential toxicity [4] |
|---|---|---|---|---|
| 100 | 0.07 | 0.09 | 98.0 | 1.29 |
| 5 | 1.13 | 1.88 | 67.7 | 1.67 |
| 4 | 1.5 | 2.5 | 57.1 | 1.67 |
| 3 | 1.5 | 3.0 | 57.1 | 2.00 |
| 2 | 2.0 | 4.0 | 42.9 | 2.00 |
| 1 | 3.0 | 6.0 | 14.3 | 2.00 |
| 0 | 3.5 | 8.0 | 0.0 | 2.29 |

[1] Methyl orange alkalinity, 88.2; pH, 8.3; and conductivity, 180.9 Mhos/18° C.
[2] Minimum lethal concentration producing 100 percent mortality.
[3] Minimum lethal concentration producing 25 percent mortality.
[4] $\frac{\text{Maximum}}{\text{Minimum}}$ The following table gives data in comparative toxicity of TFM and a mixture of TFM and 2′,5-dichloro-4′-nitrosalicylanilide (TFM-2S) in a simulated stream environment. The figures in parentheses indicate the number of specimens of each species exposed. The simulated stream was a running-water raceway consisting of a concrete trough 65 feet long, 6 feet wide and 30 inches deep. Water from Lake Huron was delivered to the head of the raceway through a surge tank to stabilize the flow.

An artificial stream bed was constructed on the floor of the raceway with materials taken from the beds of local rivers. The topography of the artificial stream provided a small mixing pool at the head of the raceway, followed by a shallow gravel riffle, and then a pool about 18 inches deep. A second shallow-water area of sandy materials was located about midway along the race. Below this point was another silt bottomed pool. At the foot of this pool a final, shallow riffle was created of sandy or silt materials. The water dropped into a waste flume from the foot of this last riffle.

Test specimens were placed in the artificial stream sufficiently in advance of treatment to allow them to become adjusted to it. The specimens of lamprey larvae were placed in cylindrical screen cages set deeply enough into the bottom to permit the larvae to establish themselves in burrows. Restriction to these cages permitted more rapid and accurate determination of mortalities. The fish were reelased into the entire raceway.

TFM or TFM-2S was metered into the water by an electric motor-driven, dual piston fluid-proportioning device. This machine pumped from a concentrated stock solution prepared as described above (col. 2, line 51), and delivered the concentrate, diluted with flush water, to a perforated pipe located in the mixing pool at the head of the raceway. The concentration of the larvicide in the raceway was controlled by regulating the concentration of the stock solution and the feed rate of the proportioning equipment.

Experimental treatment was conducted for 24 hours. During a test observations were made of all animals at intervals of 2 hours or less. Water temperatures were recorded at the head and foot of the raceway at 2-hour intervals.

4′-nitrosalicylanilide may vary considerably depending on the conditions of use.

In treating aquatic environments or habitats such as a stream according to the method of the invention, the lamprecidal composition may be added directly to the water in the form of a fine powder, with or without suitable wetting or conditioning agents to facilitate dispersal or solution. Alternatively, the compound may be added in liquid form, as solutions, suspensions or emulsions. In general aqueous solutions or dispersions are preferred as the feeding and mixing are more readily effected. These procedures are conventional in the art and are more fully discussed in Patent No. 2,821,499.

The trifluormethyl-4-nitrophenol may be used as such or in the form of its salts, e.g., sodium salt (as used in the above examples) or amine salts. Since the salts are usually much more soluble they are generally preferred since preparation of liquid compositions is facilitated thereby.

As shown in Table I, 2′,5-dichloro-4′-nitrosalicylanilide when employed alone is an extremely potent lamprecide, having a 100% larval toxicity at least about .070 p.p.m. However appreciable toxicity to rainbow trout is obtained at .080 p.p.m. in this test so that its practical use entails careful control of concentration. This is to be compared with Table III, showing the toxicity of TFM. Here the minimum concentration at 100% lamprecidal toxicity of TFM is 2.0 p.p.m., while appreciable rainbow trout toxicity is obtained between 7.0 and 9.0 p.p.m. A large spread between the relative toxicities of a lamprecidal composition as relates to lamprey larvae and trout is a desirable characteristic, since this makes for ease of application in a stream. Low toxic concentration of the composition is another desirable characteristic since this lessens the amount of chemical required to be purchased, and eases transportation difficulties involved in treating streams located far from roads in very rough country.

As shown in Table V, a mixture of 97% TFM and only 3% of the anilide shows a 100% lamprey toxicity at 0.9 p.p.m. of the mixture and an appreciable trout toxicity starting at about 2.0 p.p.m. Comparing this with the results obtained with the individual components as given in Tables I and III, it is apparent that the toxicity of the

TABLE XII.—TOXICITY IN SIMULATED STREAM [1]

| Conc. p.p.m. | TFM percentage mortality | | | | TFM-2S percentage mortality | | | |
|---|---|---|---|---|---|---|---|---|
| | Larval lamprey | Rainbow trout | Brown trout | Brook trout | Larval lamprey | Rainbow trout | Brown trout | Brook trout |
| 1.0 | 0.0 (100) | 0.0 (5) | 0.0 (5) | 0.0 (5) | 0.0 (100) | 0.0 (5) | 0.0 (5) | 0.0 (5) |
| 1.5 | 0.0 (100) | 0.0 (5) | 0.0 (5) | 0.0 (5) | 96.9 (96) | 0.0 (5) | 0.0 (5) | 0.0 (5) |
| 2.0 | 9.1 (98) | 0.0 (5) | 0.0 (5) | 0.0 (5) | 98.0 (102) | 0.0 (5) | 0.0 (5) | 0.0 (5) |
| 2.5 | 52.0 (100) | 0.0 (5) | 0.0 (5) | 0.0 (5) | 100.0 (100) | 0.0 (5) | 0.0 (5) | 0.0 (5) |
| 3.0 | 84.9 (93) | 0.0 (5) | 0.0 (5) | 0.0 (5) | 100.0 (100) | 0.0 (5) | 0.0 (5) | 0.0 (5) |
| 4.0 | 100.0 (98) | 0.0 (5) | 0.0 (5) | 0.0 (5) | 100.0 (98) | 0.0 (5) | 40.0 (5) | 0.0 (5) |
| 5.0 | 100.0 (100) | 0.0 (5) | 0.0 (5) | 0.0 (5) | 100.0 (100) | 0.0 (5) | 20.0 (5) | 0.0 (5) |
| 6.0 | ---------- | 0.0 (10) | 0.0 (10) | 0.0 (10) | ---------- | 10.0 (10) | 20.0 (10) | 0.0 (5) |
| 10.0 | ---------- | 0.0 (10) | 0.0 (10) | 0.0 (10) | ---------- | 0.0 (10) | 0.0 (10) | 20.0 (10) |
| 12.0 | ---------- | 0.0 (10) | 0.0 (10) | 20.0 (10) | ---------- | 70.0 (10) | 90.0 (10) | 60.0 (10) |

[1] The figures in parentheses indicate the number of specimens of each species exposed.

As will be seen from the data of the above tables, a concentration of 2% of 2′5-dichloro-4′-nitrosalicylanilide gave optimum results (Table VII) under the test conditions, showing 100% mortality of larval lampreys with a concentration of the lamprecide composition of 0.8 p.p.m. or above. By contrast, mortality of the trout was zero up to a concentration of 2.5 p.p.m. As explained above, however, the optimum concentration of the 2′,5-dichloro- TFM is greatly enhanced. While the toxicity spread between 100% lamprey kill and appreciable trout kill is reduced in absolute values for the TFM, it is sufficiently large to permit ready control in the field.

Analysis of the test results shows clearly that the combination of chemicals has a synergistic effect. The minimum anilide concentration required for 100% lamprecidal effect as shown in Table I is .07 p.p.m. Correspondingly, Table III shows the minimum TFM concentration to be 2.0 p.p.m. Table V shows the minimum concentration of a 3% mixture to be 0.9 p.p.m. Of this, .03 p.p.m. is the anilide and 0.87 p.p.m. is the TFM. These concentrations in both cases are far below the dosage required for 100% lamprey kill. However, the combination of compounds coact to produce 100% lamprecidal toxicity at concentrations far lower than the minimum of each compound separately. The same results are to be noted in the case of the 1% and 2% anilide compositions.

What is claimed is:

1. A method for controlling *Petromyzon marinus* lamprey comprising establishing, in cold water aquatic environments tributary to the Great Lakes of North America containing the *Petromyzon marinus* larvae and habitable by fresh water trout, a concentraion of at least about 0.07 part per million of a water dispersible lamprecidal composition that is lethal to the larvae without more than twenty-five percent trout mortality, said lamprecidal composition comprising 2',5-dichloro-4'-nitrosalicylanilide.

2. The method of claim 1 wherein the lamprecidal composition comprises a water-dispersible mixture of three parts of 2',5-dichloro-4'-nitrosalicylanilide and ninety-seven parts of 3-trifluormethyl-4-nitrophenol in a concentration of about 0.9 to about 2.3 parts per million of said mixture.

3. The method of claim 1 wherein the lamprecidal composition comprises a water-dispersible mixture of two parts of 2',5-dichloro-4'-nitrosalicylanilide and ninety-eight parts of 3-trifluormethyl-4-nitrophenol in a concentration of about 0.8 to about 2.5 parts per million of said mixture.

4. The method of claim 1 wherein the lamprecidal composition comprises a water-dispersible mixture of one part of 2',5-dichloro-4'-nitrosalicylanilide and ninety-nine parts of 3-trifluormethyl-4-nitrophenol in a concentration of about 1.4 to about 3.5 parts per million of said mixture.

5. The method of claim 1 wherein the lamprecidal composition consists essentially of 2',5-dichloro-4'-nitrosalicylanilide in a concentration of about 0.07 part per million.

6. The method of claim 1 wherein the lamprecidal composition comprises a water-dispersible mixture of 2',5-dichloro-4'-nitrosalicylanilide and 3-trifluormethyl-4-nitrophenol in a weight ratio of about 1:99 to about 3:97, the concentration of said mixture being in the range from about 0.8 to about 3.5 parts per million.

7. The method of claim 1 wherein the lamprecidal composition comprises 1 part by weight of 2',5-dichloro-4'-nitrosalicylanilide and from 0 to 99 parts by weight of 3-trifluormethyl-4-nitrophenol.

8. A method for controlling *Petromyzon marinus* lamprey which inhabit the North American Great Lakes and waters tributary thereto which comprises, establishing in aquatic environments containing the *Petromyzon marinus* larvae a concentration of water-dispersible lamprecidal composition that is lethal to the larvae without more than twenty-five percent mortality to food and game fish, particularly trout, said lamprecidal composition comprising 2',5-dichloro-4'-nitrosalicylanilide.

9. The method of claim 8 wherein the lamprecidal composition comprises 1 part by weight of 2',5-dichloro-4'-nitrosalicylanilide and from 0 to 99 parts by weight of 3-trifluormethyl-4-nitrophenol.

10. The method of claim 9 wherein the lamprecidal composition comprises 1 part 2',5-dichloro-4'-nitrosalicylanilide and from about 32 to 99 parts by weight of 3-trimethyl-4-nitrophenol.

11. The method of claim 10 wherein the lamprecidal composition comprises 1 part of 2',5-dichloro-4'-nitrosalicylanilide and about 99 parts of 3-trifluormethyl-4-nitrophenol.

12. The method of claim 10 wherein the lamprecidal composition comprises 1 part of 2',5-dichloro-4'-nitrosalicylanilide and about 32 parts of 3-trifluormethyl-4-nitrophenol.

13. The method of claim 10 wherein the lamprecidal composition comprises 1 part of 2',5-dichloro-4'-nitrosalicylanilide and about 49 parts of 3-trifluormethyl-4-nitrophenol.

14. The method of claim 8 wherein the lamprecidal composition consists essentially of 2',5-dichloro-4'-nitrosalicylanilide.

15. A method for controlling *Petromyzon marinus* comprising treating water over and in contact with cold fresh-water stream bottoms containing the larvae of *Petromyzon marinus* to maintain a concentration of lamprecidal composition in the range from about 0.8 to about 3.5 parts per million in the water, said lamprecidal composition consisting essentially of a water-soluble mixture of 2',5-dichloro-4'-nitrosalicylanilide and 3-trifluormethyl-4-nitrophenol in a weight ratio of about 1:99 to about 3:97, whereby a substantially total mortality of the larvae is obtained while a mortality of 25% or less of any trout present in the fresh-water stream is obtained.

References Cited by the Examiner

FOREIGN PATENTS

| | | |
|---|---|---|
| 1,028,381 | 4/1958 | Germany. |
| 1,084,912 | 7/1960 | Germany. |
| 814,483 | 6/1959 | Great Britain. |
| 909,234 | 10/1962 | Great Britain. |

OTHER REFERENCES

Applegate et al., "Use of Mononitrophenols containing Halogens as Selective Sea Lamprey Larvicides," Science, 127 (3294): 336–338, Feb. 14, 1958; abstracted in Chem. Abstracts, 52: 123 07C (1958).

Aquatic biocidal applications of phenols, Nolan et al., "Results of Laboratory Screening Tests of Chemical Compounds for Molluscicidal Activity. I. Phenols and Related Compounds," Am. J. Trop. Med. Hyg., 2: 716–52 (1953); abstracted in Chem. Abstracts 47: 11647h (1953).

Christie et al., "Histological Effects of 3-trifluoromethyl-4-nitrophenol (TFM) on Larval Lamprey and Trout," Can. J. Zool., 41: 51–61 (1962); abstracted in Chem. Abstracts, 58: 8373a (1963).

Aquatic Biocidal Applicaions of Salicylanilides, L. goennert et al., A New Molluscicide; Molluscicide Bayer, 73, Anais. Inst. Med Trop. Suppl. (Lisbon), 16: 197–202 (1959), in English; abstracted in Chem. Abstracts 59 2118c (1963).

Applegate et al., "Comparative Toxicity of 3-trifluoromethyl-4-nitrophenol (TFM) to Larval Lampreys and Eleven Species of Fish," Trans. Am. Fisheries Soc., 91: 342–5 (1962); abstracted in Chem. Abstracts, 58: 4848d (1963).

Applegate et al., "Toxicity of 4,346 Chemicals to Larval Lampreys and Fishes," Special Scientific Report—Fisheries No. 207, 159 pp., March 1957, Fish and Wildlife Service, United States Department of Interior, Washington, D.C.

Schiff, "Trials with a New Molluscicide, Bayer 73, in Southern Rhodesia," Bull. W.H.O., 25: 533–542 (1961).

Webbe, "Laboratory and Field Trials of a New Molluscicide, Bayer 73, in Tanganyika," Bull. W.H.O., 25: 525–531 (1961).

Schiff et al., The Short-term Effects of Three Molluscicides on the Micro-flora and Micro-fauna of Small, Biologically Stable Ponds in Southern Rhodesia, Bull. W.H.O. 25; 543-7 (1961); abstracted in Chem. Abstracts 57: 3828f–3829c (1962).

ELBERT L. ROBERTS, *Acting Primary Examiner.*

LEWIS GOTTS, *Examiner.*

SHEP K. ROSE, *Assistant Examiner.*